United States Patent [19]

Guenther et al.

[11] Patent Number: 4,462,428

[45] Date of Patent: Jul. 31, 1984

[54] THREE-WAY NEEDLE VALVE

[75] Inventors: Kenneth L. Guenther, Park Ridge; Edward H. Zemke, Chicago, both of Ill.; Gerald D. Warden, Easton, Pa.

[73] Assignee: Bell & Howell Company, Chicago, Ill.

[21] Appl. No.: 350,924

[22] Filed: Feb. 22, 1982

[51] Int. Cl.$^3$ .............................................. F16K 11/14

[52] U.S. Cl. .................................... 137/868; 137/870; 239/124

[58] Field of Search ............... 137/59.6, 596.1, 596.17, 137/867, 868, 870; 91/457; 251/122, DIG. 4; 239/124, 585

[56] References Cited

U.S. PATENT DOCUMENTS

| | | | |
|---|---|---|---|
| 332,953 | 12/1885 | Sherriff | 137/867 |
| 353,533 | 11/1886 | Brady | 137/596.1 |
| 2,232,038 | 2/1941 | Stone et al. | 137/870 |
| 2,591,801 | 4/1952 | Gardner | 137/596.17 |
| 2,799,293 | 7/1957 | Clay | 137/596.17 |
| 3,233,863 | 4/1963 | Bowen et al. | 251/DIG. 4 |
| 3,538,951 | 11/1970 | Bownass | 251/122 |
| 3,802,628 | 4/1974 | Goss et al. | 137/868 |
| 4,099,703 | 7/1978 | Lush | 251/122 |
| 4,134,572 | 1/1979 | Schmidt | 251/122 |

FOREIGN PATENT DOCUMENTS

| | | | |
|---|---|---|---|
| 355660 | 12/1922 | Fed. Rep. of Germany | 137/868 |

*Primary Examiner*—Samuel Scott
*Assistant Examiner*—Noah Kamen
*Attorney, Agent, or Firm*—Alan H. Haggard; Neal C. Johnson; Alan B. Samlan

[57] ABSTRACT

The illustrated embodiment teaches a three-way valve system for an ink jet printer. The system has an inlet, a main outlet, a vent, and two needle valves (a shut-off valve and a vent valve) which sit in respective valve guides. The passageways are arranged so that for ink to reach the outlet or vent, it travels through the shut-off valve seat and guide. Similarly, to reach the vent, fluid must pass through the vent valve seat and guide. The shut-off valve and vent valves are arranged to reciprocate through the action of a lever with a fulcrum between the two needle valves. The lever is connected to an actuator solenoid and an opposing bias spring. For opening of the valve system, the solenoid pulls the lever to shut the vent valve, thereby permitting the pressurized ink to lift the shut-off valve off its seat. When the shut-off valve is seated, a smaller area is exposed to pressure than when it is not seated. Therefore, the ink exerts a greater force on the opened shut-off valve. This greater force is communicated by the lever to seat the vent valve even more firmly. This is called self-energization. Decisive closing of the system occurs due to the vent arrangement permitting fluid in the passageways after the shut-off valve is seated to open the vent valve and exit through the vent.

13 Claims, 11 Drawing Figures

FIG. 1
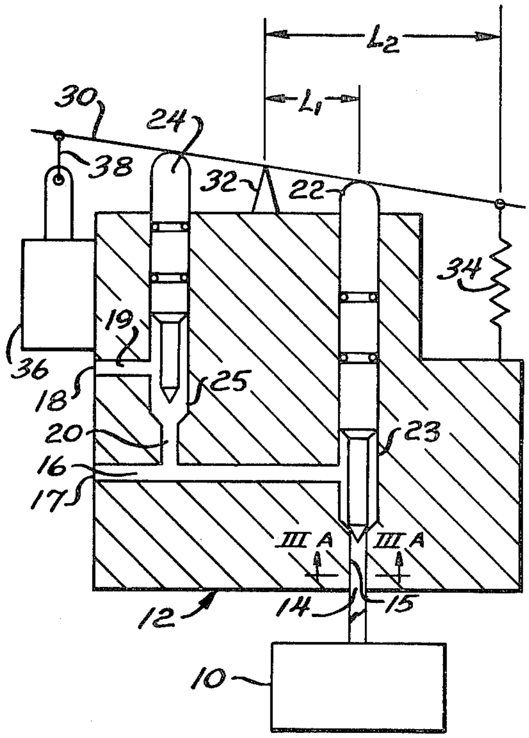
FIG. 2
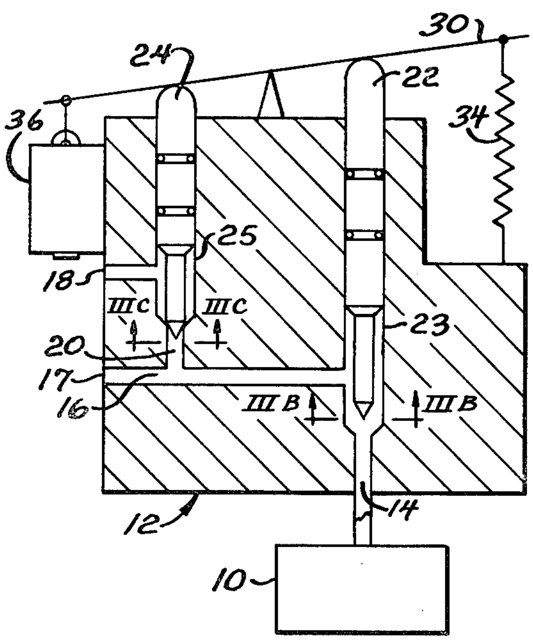
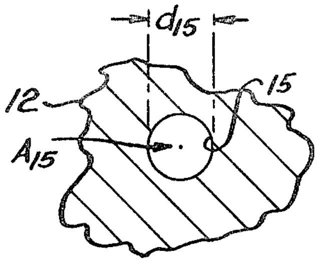
FIG. 3A
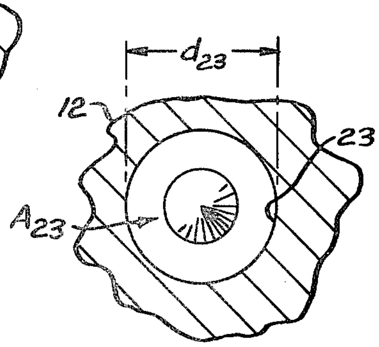
FIG. 3B
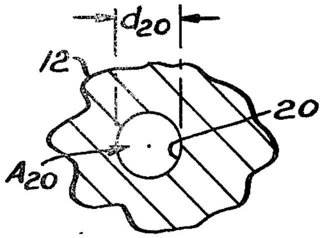
FIG. 3C

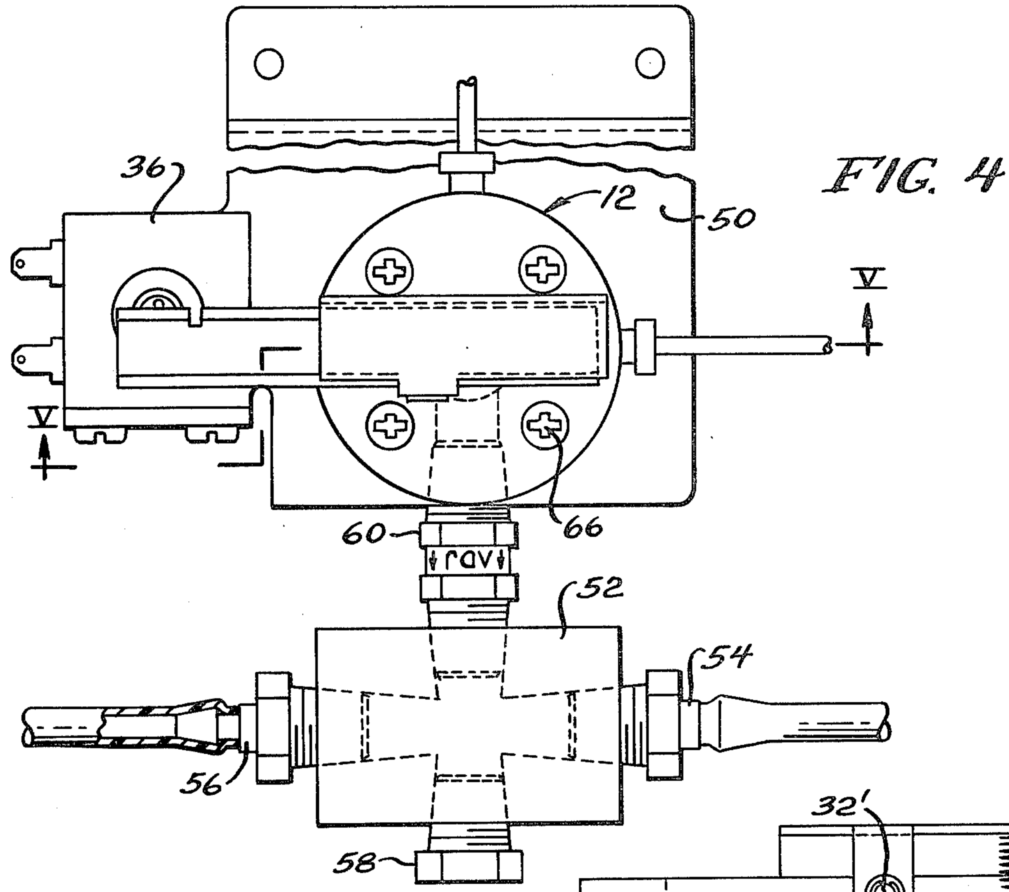
FIG. 4
FIG. 5A
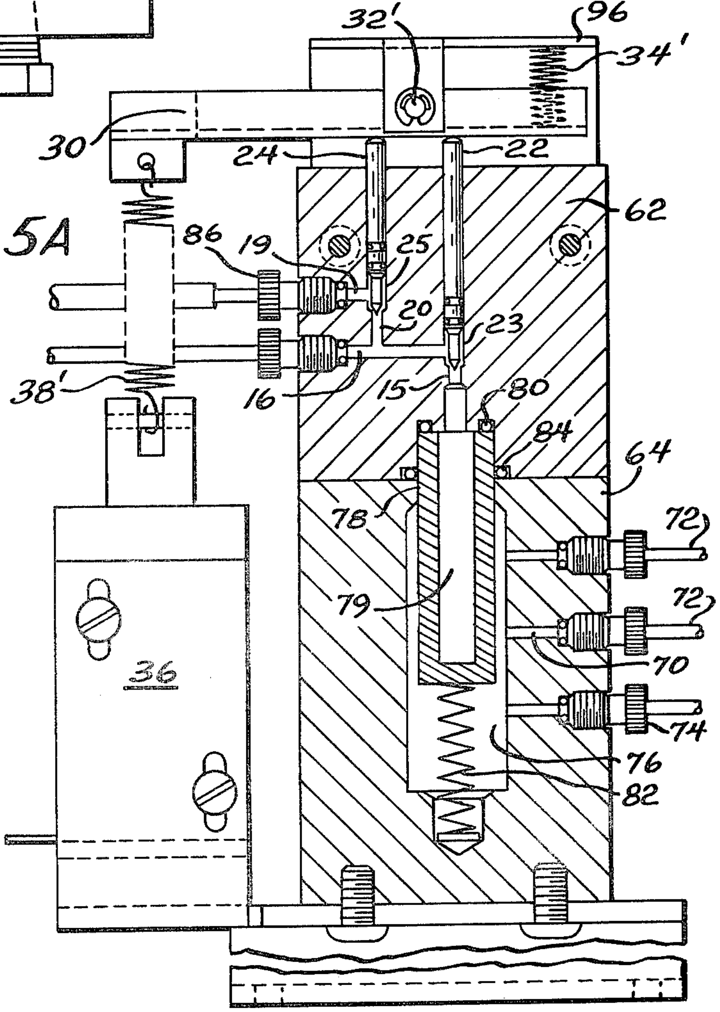
FIG. 5B
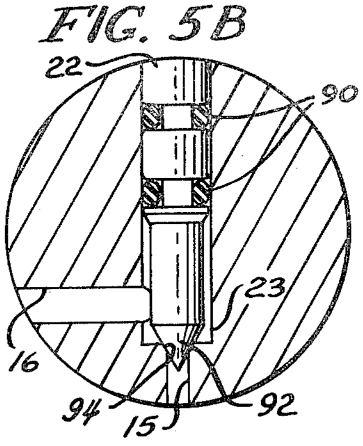

THREE-WAY NEEDLE VALVE

BACKGROUND OF THE INVENTION

The present invention relates to valves used for controlling the flow of fluids. The invention has particular applicability to control the pressurized ink in an ink jet printer. For example, the preferred embodiment of the invention is suitable for use with the ink jet printer described in U.S. Pat. No. 4,249,187 assigned to Bell & Howell Company of Chicago, Ill., the assignee also of the present invention.

In the field of ink jet printers, it is extremely important to be able to stop the flow of pressurized ink very quickly, without allowing the fluid to drool, which would result from a gradual reduction of pressure at shut-off.

Hence, one object of the present invention is to provide an improved valve system which results in a rapid and decisive shut-off of fluid flow in a pressurized fluid system while preserving efficient operation when the valve is open (for example, avoiding pressure losses).

SUMMARY OF THE INVENTION

According to certain aspects of the present invention, a valve system of compact design is provided which achieves the foregoing object. In the illustrated embodiment, a three-way valve uses a pair of similar needle valves positioned underneath a lever arm having a fulcrum. One valve operates as a shut-off valve, and the other valve operates as a vent valve. In the "open" position of the illustrated embodiment, ink flows through the inlet, past the open shut-off valve, through a main outlet passageway to a main outlet. The vent valve communicates with the main outlet passageway but is closed in this position. When the three-way valve is in the "closed" position, the shut-off valve is closed and the vent valve is open. This permits venting from the main outlet passageway to the atmosphere or to a vacuum.

In the particular device illustrated, the shut-off valve is on one side of the fulcrum, while the vent valve is on the other side. In the illustrated embodiment, a force imparting device, such as a spring, urges the shut-off valve into the normally closed position. To open the three-way valve, an opposing force imparting means, such as a solenoid, in response to an activation signal, pulls the lever in the other direction, thereby closing the vent valve. When the lever is in this position, the pressurized fluid moves the shut-off valve away from its seat so that the fluid may pass freely thereby to the main outlet port to, for example, an ink jet printer.

In accordance with one aspect of the invention, when the lever is moved by the solenoid to overcome the force imparted by the spring, the fluid under pressure, besides exiting through the main outlet port to the ink jet printer head, imparts a force to the shut-off valve which is transmitted through the lever to urge the vent valve into the closed position even more tightly. This is one example of what we call "self-energization." Such arrangement of the vent valve allows fluid flow to the outlet with diminished losses, if any, through the vent.

To close the valve, the solenoid is released, thereby permitting the spring to close the shut-off valve. Moreover, pressure in the main outlet passageway, when the shut-off valve is closed, moves the vent valve to the open position, thereby venting the main outlet passageway to the atmosphere. This release of pressure, combined with the fact that an extremely small volume of pressurized fluid is contained in the valve passages, results in a rapid and decisive shut-off of fluid flow.

BRIEF DESCRIPTION OF THE DRAWINGS

In describing illustrative and preferred embodiments of valves according to certain aspects of the present invention, reference is made to the appended drawings wherein:

FIG. 1 is an illustrative sketch of a three-way valve, according to the present invention, in a closed position;

FIG. 2 is an illustrative sketch of the valve of FIG. 1 in an open position;

FIGS. 3A, 3B, 3C are sketches illustrating sectional areas in the valve sketches of FIGS. 1 and 2;

FIG. 4 is a plan view of a preferred embodiment of a valve constructed according to certain aspects of the present invention;

FIG. 5A is a sectional view of the valve taken along the lines V—V of FIG. 4, and FIG. 5B is an expanded view of part of FIG. 5A;

DETAILED DESCRIPTION

Figure 6:
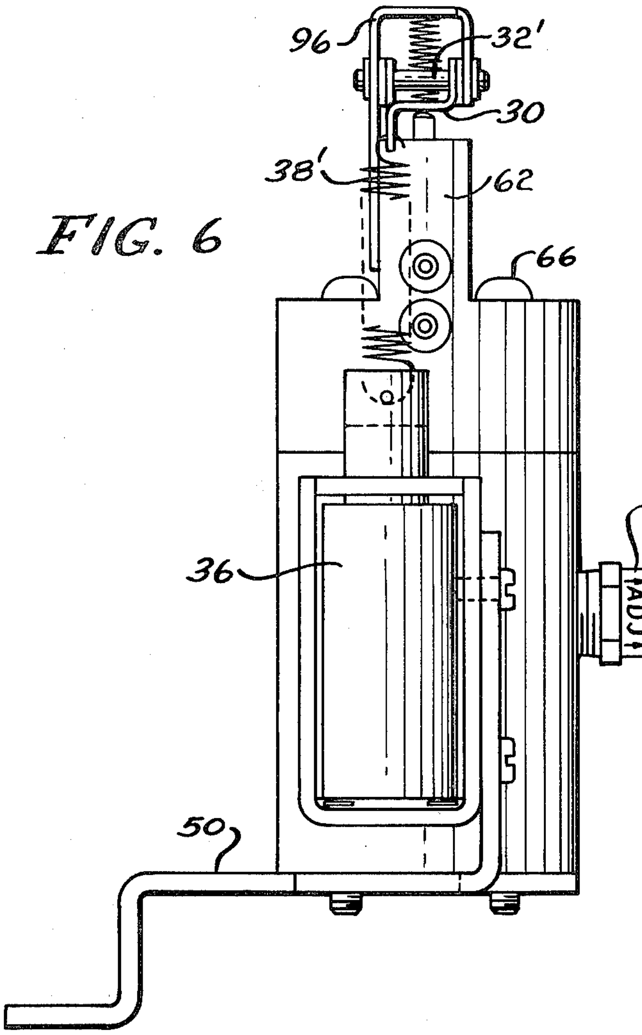
FIG. 6 is a leftside view of the valve of FIG. 4.

FIG. 1 is a sketch illustratively showing a self-energizing three-way needle valve embodying certain aspects of the present invention. Pressurized ink from a source 10 enters the valve 12 through an inlet port 14 and inlet passageway 15. The other conduits for the passage of pressurized fluid in valve system 12 include a main outlet passageway 16 and main outlet port 17 (connected to an ink jet printer, for example), a vent outlet port 18 open to the atmosphere, for example, with a vent passageway 19 and a vent connecting passageway 20.

A needle valve 22 is located slidably in a respective guide 23 which provides part of the path through which ink flows. Valve 22 is called a shut-off valve because in the position shown in FIG. 1, it shuts off the ink from the main outlet passageway 16. A second needle valve 24 located slidably in a respective guide 25 is called the vent valve and is in the position illustrated in FIG. 1 when the three-way valve 12 is closed. It can be seen that the vent valve 24 in the position shown permits the free flow of pressurized fluid from main passageway 16 to the vent 18 via vent connecting passage 20.

Also included in the three-way valve 12 is a rocker arm or lever 30 pivoted on a fulcrum 32. The ends of valves 22 and 24 extend outward from the main body of three-way valve 12 to positions just underneath lever 30. These parts are configured so that a force imparting means such as a spring 34 pulls on the lever 30 causing it normally to close the shut-off valve 22. On the other side of the fulcrum 32 is an electrically operated solenoid 36 coupled by a linkage 38 to the lever 30. When solenoid 36 is operated, it overcomes the force of spring 34 and pulls the lever 30 down to force vent valve 24 towards the closed position. The activated position of solenoid 36 is shown in FIG. 2.

Still referring to FIG. 1, it can be seen that spring 34 has a mechanical advantage against shut-off valve 22 because shut-off valve 22 engages the underside of lever 30 at a distance $L_1$ from the fulcrum 32, whereas spring 34 engages the same side of the lever 30 at a greater distance of $L_2$ from the fulcrum. It will be appreciated that spring 34 must impart sufficient force to keep the shut-off valve closed. This force is related to the fluid pressure and the area on which the pressure acts in the closed position. It will be appreciated that this force can be determined from the following equation (1):

$$F_{34}=K_1PA_{15}(L_1/L_2)$$

where $K_1$ is a safety factor to assure proper valve seating, P is the pressure of the pressurized fluid from source 10, $A_{15}$ is the area of the closed needle valve which may be calculated using the diameter $d_{15}$ (FIG. 3A), and $L_1$ and $L_2$ are the distances from the fulcrum 32.

In this closed, FIG. 1 position of the three-way valve, the vent needle valve, according to the illustrated embodiment, is not pulled away from its valve seat by lever 30 because there need not be a permanent engagement of the lever and valve 24. The pressure of the ink in passageways 16 and 20, when shut-off valve 22 is seated, forces vent valve 24 away from its seat, allowing the pressurized ink to pass freely through part of guide 25 to the vent outlet port 18 and passageway 19. It will be understood that according to another aspect of the present invention, an extremely small volume of pressurized fluid is contained in the passageways. Accordingly, the venting through vent outlet port 18, in view of the small volume of fluid in the passageways, results in a rapid and decisive shut-off of flow.

The illustrated three-way valve also includes a self-energizing feature which will be understood with reference to FIG. 2, which illustrates the three-way valve in the open position. Solenoid 36 has been activated previously to overcome the force of spring 34 and to seat the vent valve 24. As soon as the force of spring 34 was overcome, the pressurized fluid acted in the area $A_{15}$ and pushed the shut-off needle valve 22 away from its seat. This permitted the pressurized ink to enter the passageways 16 and 20. However, the force of solenoid 36 seated vent valve 24 to prevent the passage of the pressurized ink to vent outlet passageway 19.

When the shut-off needle valve 22 is moved off of its seat, it exposes a larger area $A_{23}$ (see FIG. 3B) to the pressurized ink. This larger area increases the force urging shut-off valve 22 away from its seat. This force is defined in equation (2) as follows:

$$F_{22}=PA_{23}$$

where $F_{22}$ is the force urging needle valve 22 away from its seat, P is the pressure of ink from source 10, and $A_{23}$ is the area of the shut-off valve 22 in its guide 23 exposed to the pressure (see FIG. 3B).

It will be appreciated that this force $F_{22}$ causes shut-off valve 22 to slide in its guide 23 until it engages lever 30. Then, this upward force $F_{22}$ is transmitted by lever 30 to vent valve 24 to urge it to the closed position. The area of vent needle valve 24, when seated, is small, as defined by the following equation (3) which is the force exerted by the pressurized fluid urging valve 24 away from its seat:

$$F_{24}=PA_{20}$$

where $F_{24}$ is the upward force on valve 24 in FIG. 2, P is the pressure of the ink from source 10, and $A_{20}$ is the area of the closed needle valve 24 exposed to the ink (see FIG. 3C).

Assuming no mechanical advantage imparted by the lever 30, it will be understood that, wholly apart from the forces imparted by spring 34 and solenoid 36, the net force on valve 24 resulting from the pressure of the ink acting on valves 22 and 24 is a downward force which urges valve 24 against its seat. This is because the area $A_{23}$ is greater than the area $A_{20}$.

FIGS. 4 through 8 illustrate a preferred embodiment of a three-way valve constructed according to aspects of the present invention. FIG. 4 is a plan view of the valve system 12 supported on a steel mounting bracket 50. A manifold 52 is shown connected to valve system 12, and includes ports 54 and 56 for connection to other apparatus, an ink piercing assembly and a capsule filter. A further port 58 is normally closed. Manifold 52 is connected to valve system 12 via a check valve 60 (shown further in FIG. 8).

Referring to FIG. 5A, which is a sectional view of the valve of FIG. 4 taken along the line V—V, further details of the preferred embodiment can be seen. The valve assembly 12 has a main body consisting of a head 62 and base 64 made ofan acetyl homopolymer. The head is joined to the base by four machine screws 66 shown most clearly in FIGS. 4, 6 and 7. The ink inlets to valve system 12 are a group of inlet ducts 70 located in base 64. Conduits 72 connect ducts 70 to an ink pump. The bottom port is not used in the preferred embodiment and is closed by a plug 74. Ducts 70 lead to a cylindrical chamber 76 which communicates with manifold 52 via check valve 60 (not shown in FIG. 5A). A cylindrical filter 78 made of porous stainless steel and having an internal cavity 79 extends into chamber 76 and is forced against an O-ring 80 in head 62 through the action of a spring 82 mounted upon the base of chamber 76. O-ring 80 together with a further O-ring 84 around the outside circumference of filter 78 located at the junction of head 62 and base 64 provide a good seal so that only filtered ink can be admitted to the passageways in head 62.

The passageways in head 62 shown in FIG. 5A are the passageway 15 which is the main ink inlet passageway, the main outlet passageway 16 leading to a connection to the print head, the vent outlet passageway 19, and the vent connecting passageway 20. Suitable threaded connectors 86 facilitate connection to these passageways (except for the wholly internal passageway 20).

Also shown in FIG. 5A is the shut-off needle valve 22 in its guideway 23, and vent valve 24 in its guideway 25.

FIG. 5B is an expanded view of the valve seat area for the shut-off valve 22, the inlet passageway 15 and main outlet passageway 16 in relation to the shut-off valve 22 in its guide 23. Shut-off needle valve 22 includes a pair of O-rings 90 to reduce any losses through the guidway 23. As can be seen from the drawing, valve seat 94 forms a first angle and needle trip 92 forms a second angle. To maintain good seating of the valve in use, the first angle is smaller than the second angle. Valve seat 94 is integral with passageway 15, and is made of the same material as head 62 and base 64, i.e. an acetyl homopolymer.

Figure 7:
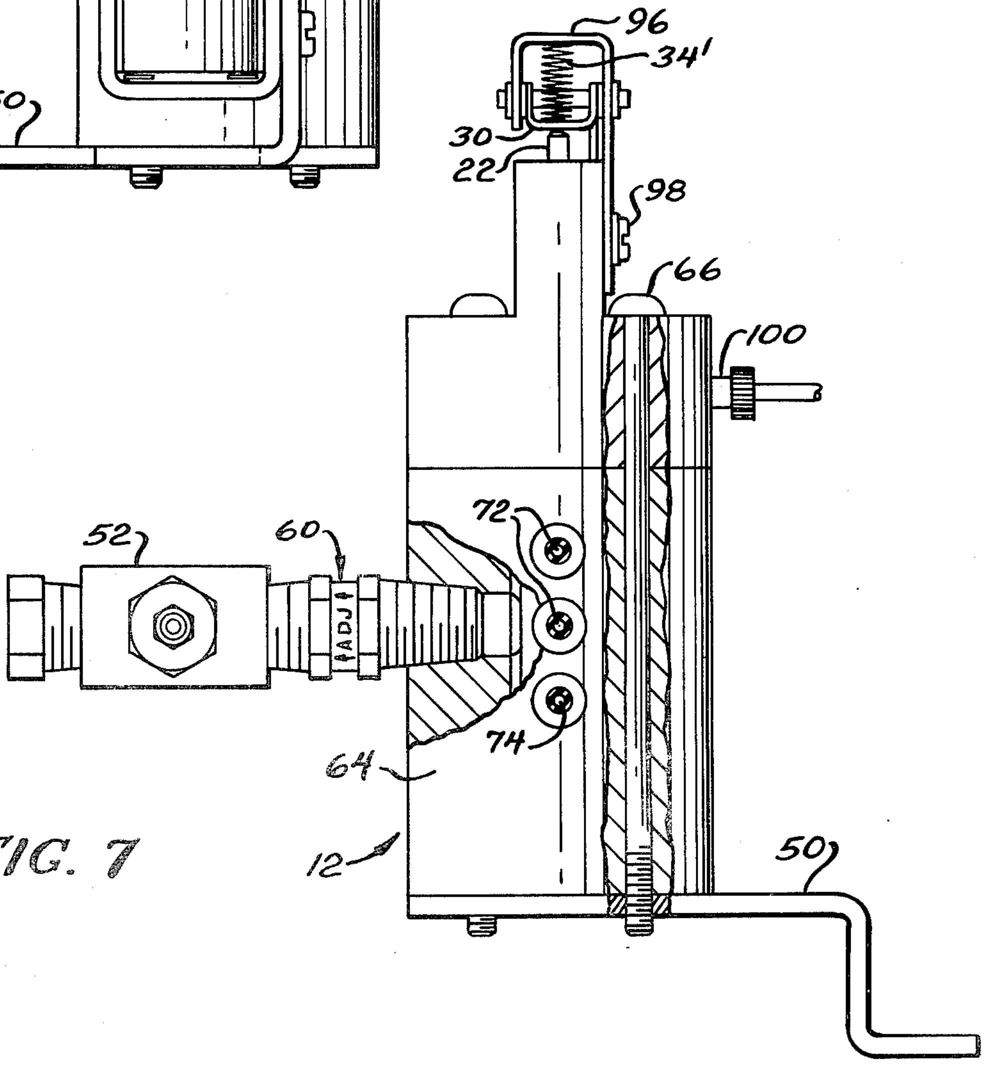
FIG. 7 is a rightside view of the valve of FIG. 5.

FIG. 5A most clearly shows the lever 30, which is made of steel. In cross-section, most of lever 30 is a U-shaped channel (FIG. 6). A pin 32′ passes through the side walls of lever 30 and operates as the fulcrum 32. Pin 32′ is mounted on a top bracket 96 which is made of steel and connected to head 62 by a pair of screws 98 (FIG. 7). A spring 34' (FIGS. 5A and 7) corresponds to the spring 34 of FIGS. 1 and 2. Spring 34' is connected to the underside of top bracket 96 to urge the right-hand portion of lever 30 towards head 62. Solenoid 36 is shown connected by a spring 38' to the left side of lever 30.

It can also be seen from FIG. 5A that the tops of needle valves 22 and 24 project out from head 62 into the region of lever 30. It will be noted that in the preferred embodiment, neither of needle valve 22 or 24 need be fastened permanently to lever 30.

Referring now to FIG. 7, it will be seen that a further outlet 100 is provided. Outlet 100 may be connected to a pressure gauge to monitor the pressure of the ink to the print head.

Figure 8:
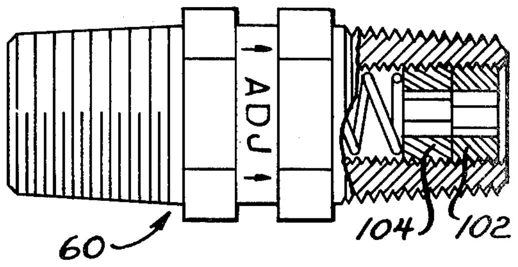
FIG. 8 is a view with parts broken away of a pressure adjusting device used in the valve of FIG. 4.

With further regard to the pressure, FIG. 8 illustrates the check valve 60, whose function is to adjust the pressure. Check valve 60 includes a locking screw 102 and an adjusting screw 104. The locking screw and adjusting are arranged to be turned together to adjust the check valve to the desired pressure. Then, the locking screw alone is turned to lock both screws at that setting.

It will be understood and appreciated by those skilled in the art that the several aspects of the present invention can be embodied in different forms from what has been described and shown herein. Other mechanisms can be used so that the valve is "self-energizing," that is, so that one valve is urged closed by a net force exerted by the pressurized fluid. In the embodiments described herein, this occurs when the shut-off valve 22 is lifted off its seat, thereby to expose a larger area to the pressure to result in a force which is transmitted via lever 30 to urge vent valve 22 to be seated. Modifications to this and other aspects of the disclosed embodiment will be apparent to those skilled in the art, and such modifications are intended to be within the scope of the present invention which is defined by the appended claims.

What is claimed is:

1. A three-way control valve assembly comprising:
- a housing having an inlet passageway for admitting a fluid under pressure;
- a main outlet passageway for said fluid in said housing;
- a first needle valve movable between open and closed positions and interposed in the flow between said inlet passageway and main outlet passageway for interrupting the flow of said fluid from said inlet to said main outlet passageway;
- a vent passageway in said housing communicating with said main outlet passageway;
- a second needle valve interposed in the flow between said vent passageway and main outlet passageway and movable between open and closed positions;
- a coupling device arranged to transmit a force applied by the pressurized fluid against said first needle valve from said first needle valve to said second needle valve;
- a biasing device for urging said first needle valve into a closed position;
- an actuator device arranged to urge said second needle valve toward a closed position, whereby when said first needle valve is open the force transmitted to the second needle valve aids in maintaining the second needle valve closed and when said first needle valve is closed, any remaining pressurized fluid in said main outlet passageway urges said second needle valve toward an open position permitting said remaining pressurized fluid to pass through the vent passageway.

2. The control valve according to claim 1 wherein said first needle valve contains two differing areas, one larger and one smaller, which can be exposed to said pressurized fluid, said smaller area being located to be exposed to said pressurized fluid when said first needle valve is in the closed position, said larger area being located to be exposed to said pressurized fluid when said first needle valve is not in a closed position, whereby the force operating on said first needle valve by virtue of the pressure of said fluid is smaller when said first needle valve is in a closed position than when said first needle valve is not in a closed position.

3. The control valve of claim 2 wherein said first needle valve has a guideway of a first cross-sectional area and a needle fitting into a corresponding valve seat in said inlet passageway and wherein said inlet passageway has an area smaller than the area of said guide area.

4. The control valve of claim 2 or 3 wherein said second needle valve has a guideway and needle portion, and has a valve seat formed in said passageway coupling said main outlet passageway with said vent passageway.

5. The control valve according to claim 3 wherein said valve seats are formed of the same material as the valve body.

6. The control valve of claim 1 wherein said coupling provides a mechanical advantage for the force transmitted therethrough from said first needle valve to said second needle valve.

7. A three-way control valve for decisive starting and stopping the flow of a pressurized fluid to permit the rapid shutting off of flow with a rapid reduction of pressure comprising:
- a housing having an inlet for receiving a pressure under fluid, an inlet passageway communicating with said inlet, a main outlet passageway communicating with said inlet passageway, a vent passageway and a vent coupling passageway communicating between said main outlet passageway and said vent passageway;
- a first valve and corresponding valve seat disposed in said housing for preventing the flow of said pressurized fluid through said main outlet passageway;
- a second valve and corresponding valve seat in said housing for preventing the flow of said pressurized fluid through said vent passageway;
- a mechanical lever having a fulcrum between said first and second valves, said lever operatively engaging said first and second valves, whereby movement of one valve away from its seat causes said lever to move said other valve toward its seat;
- a biasing device operatively connected to urge said first valve into a closed position; and an actuator device operatively connected with the second valve to urge it into a closed position.
- said mechanical lever coupling said first and second valves so that opening of said first valve to permit the flow of said pressurized fluid results in said pressurized fluid exerting a force which is communicated from said first valve to said second valve by said mechanical lever to urge said second valve toward the closed state.

8. The control valve according to claim 7 wherein said first and second valves are needle valves, said first valve having a seat positioned between said inlet port and said outlet port, said second valve having a seat positioned interposed between said outlet port and said vent port.

9. The control valve according to claim 8 wherein said valve seats are integral with and formed of the same material as said housing.

10. A control valve for decisive starting and stopping the flow of a pressurized fluid comprising:

a housing having first and second valve guides;

first and second parallel needle valves disposed at least partially within said valve guides within said housing, each of said first and second needle valves having a larger body portion and smaller tip portion configured to engage respective valve seats;

said housing defining an inlet port, an inlet passageway from said inlet port to said first valve guide, a main outlet port, a main outlet passageway connecting said main outlet port with said first valve guide, a vent outlet port, a vent passageway from said vent outlet port to said second valve guide, and a vent connecting passageway connecting said second valve guide and said main outlet passageway, whereby but for said needle valves, all ports and passageways communicate;

first and second valve seats corresponding to said first and second needle valves, said first valve seat being disposed intermediate said inlet port and said main outlet port, said second valve seat being interposed between said vent coupling passageway and said vent outlet, each of said seats allowing said corresponding tip portions to present respective areas to pressurized fluid when closed thereby;

said larger needle valve body portion in said valve guides being larger in cross-sectional area than their said respective smaller areas presented to pressurized fluid when seated;

a lever connected to a pivot and positioned to engage said first needle valve when said first needle valve moves from a closed position toward an open position, said lever placing said needle valves in a reciprocating position so that movement of one needle valve away from its valve seat causes said lever to move the other of said needle valves toward its valve seat;

actuator means coupled to said valve system to urge said second needle valve into its valve seat in response to an actuation signal, whereby when said first needle valve is in a closed position, pressurized fluid in said main outlet passageway urges said second needle valve away from its valve seat thereby to permit said pressurized fluid to exit through said vent outlet port, and when said second needle valve is urged against its valve seat through the action of said actuator means, said pressurized fluid exerts a first force against said first needle valve urging it away from its valve seat and after said first needle valve is moved away from its valve seat, said pressurized fluid exerts a second force greater than said first force on said first needle valve, said second force being transmitted through said lever to urge said second valve against its valve seat.

11. The control valve according to claim 1, 2, 7 or 10 further comprising a filter intermediate said inlet port and said main outlet port.

12. A control valve according to claim 10 wherein said valve seats in cross-section form a first angle and wherein said valve tips in cross-section form a second angle smaller than said first angle.

13. A three-way, self-energizing control valve for decisive starting and stopping the flow of a pressurized fluid to permit the rapid shutting off of flow with a rapid reduction of pressure comprising:

a housing containing a shut-off needle valve and a vent needle valve, each of said needle valves having respective guides and having respective valve seats, each of said valves having a needle portion having a first cross-sectional area fitting in its respective seat and a body portion having a second cross-sectional area fitting in its respective guide larger than said first cross-sectional area;

an inlet port and inlet passageway for receiving pressurized fluid, said shut-off valve seat being disposed in said inlet passageway;

said housing defining a main outlet port and a main outlet passageway communicating from said main outlet port to a lower portion of the guide for said shut-off needle valve thereby to permit the unrestricted flow of pressurized fluid from said inlet port through said inlet passageway, said shut-off valve guide lower portion, and said main outlet passageway to said main outlet port;

said housing defining a vent outlet port and a vent passageway communicating said vent outlet port to the lower portion of said vent needle valve guide;

said housing defining a vent connecting passageway communicating said main outlet passageway to said valve seat for said vent needle valve, whereby when said vent needle valve is open, pressurized fluid may flow from said main outlet passageway through said vent coupling passageway, said needle valve seat, and said vent passageway to said vent;

a lever and a fulcrum associated with said housing and placing said shut-off needle valve and vent needle valve into reciprocating engagement wherein movement of said shut-off needle valve away from its valve seat causes movement of said vent needle valve towards its valve seat, whereby when said shut-off needle valve is in a closed position, a first force is exerted on said shut-off needle valve away from its valve seat by said pressurized fluid, but when said shut-off needle valve is moved away from its valve seat, a second and greater force is exerted by said pressurized fluid on said shut-off needle valve, which force is transmitted via said lever to urge said vent needle valve in reciprocating fashion into its valve seat;

a biasing device associated with said lever and said housing and positioned to cause said shut-off needle valve into its closed position despite said first force exerted on said shut-off needle valve by said pressurized fluid; and an actuator device associated with said lever and said housing, and in response to an actuation signal, moving said lever to permit said shut-off needle valve to move away from its valve seat and concomittantly to move said vent needle valve into its valve seat, whereby, when said actuation device is actuated, said shut-off valve is opened and said vent valve is closed to result in a self-energization as a result of said second force on said shut-off needle valve being communicated via said lever to said vent needle valve.

* * * * *